United States Patent Office 3,493,556
Patented Feb. 3, 1970

3,493,556
MONOAZO THIADIAZOLE DYES
Max A. Weaver and David J. Wallace, Kingsport, Tenn., assignors to Eastman Kodak Company, Rochester, N.Y., a corporation of New Jersey
No Drawing. Filed Dec. 30, 1966, Ser. No. 605,975
Int. Cl. C09b 29/06; C07d 91/62; D06p 1/02
U.S. Cl. 260—158
9 Claims

ABSTRACT OF THE DISCLOSURE

Water-insoluble monoazo compounds prepared by coupling a diazotized 2-amino-1,3,4-thiadiazole with a N-dicarboximidoalkylaniline coupling component are useful as dyes for hydrophobic textile materials.

---

This invention relates to certain novel thiadiazolylazo compounds and, more particularly, to thiadiazolylazo compounds containing a dicarboximido group which are useful as dyes for hydrophobic textile fibers.

The azo compounds of the invention are characterized by the general formula (I)
$$R-N=N-R^1-N\begin{matrix}R^2\\ \\R^3-Z\end{matrix}$$

wherein

R represents a 1,3,4-thiadiazol-2-yl group;
$R^1$ represents a p-phenylene group;
$R^2$ represents an alkyl group, a cycloalkyl group, a phenyl group or the group —$R^3$—Z;
$R^3$ represents an alkylene group; and
Z represents a dicarboximido group.

The azo compounds of the invention give orange to pink dyeings having excellent fastness when applied to hydrophobic textile fibers, yarns and fabrics by conventional means. Cellulose acetate, polyamide and polyester fibers are illustrative of the hydrophobic textile materials which can be dyed with the compounds of the invention. The compounds of the invention are water insoluble and therefore can be applied to hydrophobic textile materials by methods well known in the art of disperse dyes. Coloration of such textile materials can also be effected by incorporating the novel compounds into the dope or melt prior to spinning and then spinning the fiber as usual.

Typical of the 1,3,4-thiadiazol-2-yl groups represented by R are 5-methyl-1,3,4-thiadiazol-2-yl,
5-thiocyanato-1,3,4-thiadiazol-2-yl,
5-ethylthio-1,3,4-thiadiazol-2-yl,
5-phenylthio-1,3,4-thiadiazol-2-yl,
5-cyclohexylthio-1,3,4-thiadiazol-2-yl,
5-acetamido-1,3,4-thiadiazol-2-yl,
5-chloro-1,3,4-thiadiazol-2-yl,
5-β-cyanoethylthio-1,3,4-thiadiazol-2-yl,
5-ethoxycarbonyl-methyl-1,3,4-thiadiazol-2-yl,
5-phenylsulfonyl-1,3,4-thiadiazol-2-yl, etc.

Preferred groups represented by R can be characterized by the formula $$X-\underset{S}{\underset{\|}{\overset{N-N}{\diagdown\diagup}}}-$$

wherein X represents hydrogen, lower alkyl, e.g., methyl, ethyl, butyl; substituted lower alkyl such as haloalkyl, e.g., β-chloroethyl, gamma-bromopropyl, trifluoromethyl, cyanoalkyl, e.g., β-cyanoethyl, nitroalkyl, e.g., β-nitroethyl, hydroxyalkyl, e.g., β-hydroxyethyl; alkoxyalkyl, e.g., β-methoxyethyl; phenoxyalkyl, e.g., β-phenoxyethyl; lower alkanoylamino, e.g., acetamido; halogen, e.g., chloro, bromo; cyano; lower alkylsulfonyl, e.g., methylsulfonyl; substituted lower alkylsulfonyl, e.g., cyanoethylsulfonyl; aryl, e.g., phenyl; benzamido; lower alkoxycarbonyl, e.g., ethoxycarbonyl, sulfamoyl; N-lower alkyl sulfamoyl, e.g., N-ethylsulfamoyl; lower alkylsulfonamido, e.g., methylsulfonamido; thiocyanato; lower alkylthio, e.g., methylthio; cyanoalkylthio, e.g., β-cyanoethylthio; arylthio, e.g., phenylthio; cycloalkylthio, e.g., cyclohexylthio, etc. As used in the above description and hereinafter, the term lower is used in its conventional sense to mean an alkyl moiety having up to about 4 carbon atoms.

The p-phenylene group represented by $R^1$ can be substituted or unsubstituted. Typical of the p-phenylene groups represented by $R^1$ are p-phenylene, 3-methyl-4-phenylene, 3-chloro-4-phenylene, 3-bromo-4-phenylene, 3-methoxy-4-phenylene, 2-methoxy-5-chloro-4 - phenylene, m-ethyl-p-phenylene, m-acetamido-p-phenylene, 2-acetamido-5-methyl-4-phenylene, 2,5 - dimethoxy-4-phenylene, etc. The designation of the position of the substituents on the p-phenylene groups represented by $R^1$ is made with reference to the aniline intermediates, i.e., the anilino nitrogen atom is at the 1 position. A preferred group of the p-phenylene groups represented by $R^1$ have the formula:

$$-\underset{(Y)_n}{\diagdown\diagup}-$$

wherein Y represents hydrogen, lower alkyl, e.g., methyl, ethyl, butyl; substituted lower alkyl such as haloalkyl, e.g., β-chloroethyl; cyanoalkyl, e.g., β-cyanoethyl; nitroalkyl, e.g., β-nitroethyl; hydroxyalkyl, e.g., β-hydroxyethyl; lower alkoxyalkyl, e.g., β-methoxyethyl; β,gamma-dihydroxypropyl; lower alkoxy, e.g., methoxy, ethoxy, propoxy, butoxy; substituted lower alkoxy, e.g., β-cyanoethoxy; lower alkanoylamino, e.g., acetamido; halogen, e.g., chloro, bromo; benzamido; phenylalkoxy, e.g., benzyloxy; hydroxyl; lower alkylthio, e.g., methylthio; etc., and n represents 1 or 2. When n is 2, Y can be the same or different.

The alkyl group represented by $R^2$ can contain up to about 8 carbon atoms and can be straight or branch chain, unsubstituted or substituted. Typical alkyl groups represented by $R^2$ are methyl, ethyl, propyl, isopropyl, butyl, hexyl, 2-ethylhexyl, hydroxyalkyl, e.g. hydroxyethyl, polyhydroxyalkyl, e.g. 2,3-dihydroxypropyl, lower alkoxyalkyl, e.g. β-methoxyethyl, nitroalkyl, e.g. β-nitroethyl, cyanoalkyl, e.g. β-cyanoethyl, cyanoalkoxyalkyl, e.g. β-cyanoethoxyethyl, lower alkanolyloxyalkyl, e.g. β-acetoxyethyl, lower alkoxycarbonyl, e.g. β-ethoxycarbonylethyl, haloalkyl, e.g. β-chloroethyl, gamma-chloropropyl, β-bromoethyl, hydroxyhalogenoalkyl, e.g. gamma-chloro-β-hydroxypropyl, lower alkanoylamidoalkyl, e.g. β-acetamidoethyl, carbamoylalkyl, e.g. β-carbamoylethyl, N-lower alkylcarbamoylalkyl, e.g. β-N-methylcarbamoylethyl; N-phenylcarbamoyloxyalkyl, e.g. β-N-phenylcarbamoylethyl; lower alkylsulfonylalkyl, e.g. β-methylsulfonylethyl, aryl, e.g. benzyl; benzoloxy, phenoxyalkyl, e.g. β-phenoxyethyl; lower alkylsulfonamidoalkyl, e.g. methylsulfonamiodethyl; N-phenylcarbamoyloxy; etc. The alkyl group represented by $R^2$ is preferably lower alkyl, e.g. having up to about 4 carbon atoms. However, when the alkyl group is substituted by a carbon containing substituent, e.g. alkoxy, the preferred substituted alkyl group can contain up to about 8 carbon atoms, e.g. delta-butoxybutyl.

The phenyl groups represented by $R^2$ include, for example, phenyl and phenyl substituted with lower alkyl, lower alkoxy, nitro, halogen, etc. Illustrative of such groups are phenyl, p-tolyl, m-nitrophenyl, o,p-dichlorophenyl, and p-anisyl. Cyclohexyl is typical of the cycloalkyl groups which R² represent.

The alkylene group represented by R³ can be straight or branched chain, unsubstituted or substituted alkylene of up to about 8 carbon atoms. Preferably, R³ represents a lower alkylene group having up to about 4 carbon atoms. Examples of the alkylene groups represented by R³ are ethylene, propylene, isopropylene, n-butylene, isobutylene, hexamethylene, haloalkylene, e.g. 2-chloropropylene, 2-bromopropylene, chloroethylene, hydroxyalkylene, e.g. 2-hydroxypropylene, hydroxyethylene, lower alkanoyloxyalkylene, e.g. 2-acetoxypropylene, etc.

Typical dicarboxyimido groups represented by Z include succinimido, phthalimido, tetrachlorophthalimido, tetrahydrophthalimido, hexahydrophthalimido, 3-nitrophthalimido, 3-methylphthalimido, 3-aminophthalimido, glutarimido, bicyclo[2.2.1]-5-heptene-2,3-dicarboximido, 1,8-naphthalimido, citraconimido, cycloalkanedicarboximido such as

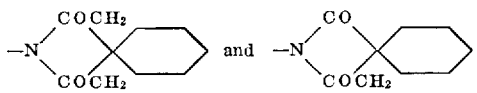

The dicarboximido group Z can be characterized further by the formula

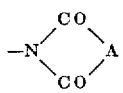

wherein A represents the carbon atoms, which with the imido nitrogen atom and the carbonyl carbon atoms, complete a ring of 5 to 6 atoms. Typical of the divalent group represented by A is alkylene of 2 to 3 carbon atoms, e.g. ethylene, propylene and lower alkyl substituted derivatives thereof, e.g. isopropylene, isobutylene, 2,3-butylene, etc. A can also represent vinylene, e.g. maleimido, lower alkyl substituted vinylene, e.g. citraconimido, o-phenylene, cyclohexyl-1,3-diyl, etc.

As is well known in the art of dyes, the color of the novel compounds of the invention is attributable to the conjugated thiadiazolylazophenyl system. The groups represented by X and Y and the substituents, if any, that are present on the groups represented by R², R³ and Z do not significantly effect the usefulness of the compounds as dyes for hydrophobic textile materials. These groups and substituents function primarily as auxochrome groups to control the shade of the compounds.

A particularly preferred group of the novel thiadiazolylazo compounds of the invention have the formula

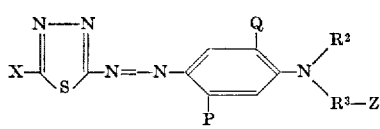

wherein X represents lower thioalkyl or thiophenyl; P represents hydrogen, lower alkyl, lower alkoxy, halogen, or lower alkanoylamino; Q represents hydrogen, lower alkyl, lower alkoxy, or halogen; R² represents lower alkyl or an alkyl group having 2 to about 4 carbon atoms substituted with halogen, hydroxy, cyano, lower alkanoyloxy, lower alkoxy, lower alkylsulfonyl, carbamoyl, N-phenylcarbamoyloxy, or lower alkoxycarbonyl; R³ represents alkylene of up to about 4 carbon atoms or alkylene of 2 to about 4 carbon atoms substituted with hydroxy, halogen, or lower alkanoyloxy; and Z represents succinimido or phthalimido.

The thiadiazolylazo compounds of the invention are prepared according to well-known procedures by diazotizing 2-aminothiadiazoles having the formula (II) 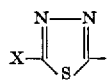

and coupling the diazonium salt with a dicarboximidoalkyl aniline coupling component having the formula (III) 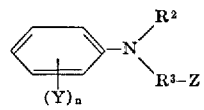

wherein X, R², R³, Y, Z and n are defined above.

Representative 2-aminothiadiazoles of Formula II, above, which are diazotized and coupled with appropriate coupling components, include 2-amino-5-methylthio-1,3,4-thiadiazole;
2-amino-5-ethylthio-1,3,4-thiadiazole;
2-amino-5-phenylthio-1,3,4-thiadiazole;
2-amino-5-cyclohexylthio-1,3,4-thiadiazole;
2-amino-5-methylsulfonyl-1,3,4-thiadiazole;
2-amino-5-methyl-1,3,4-thiadiazole;
2-amino-5-phenyl-1,3,4-thiadiazole;
2-amino-5-acetamido-1,3,4-thiadiazole;
2-amino-5-phenylsulfonyl-1,3,4-thiadiazole;
2-amino-5-chloro-1,3,4-thiadiazole;
2-amino-5-carbomethoxyethyl-1,3,4-thiadiazole; and the like.

Representative dicarboximidoalkyl aniline coupling components of Formula III, above, include N-ethyl-N-β-succinimidoethyl-m-toluidine;
N-β-chloroethyl-N-β-succinimidoethyl-m-toluidine;
N-[2-(N-ethyl-m-toluidino)ethyl]maleimide;
N-ethyl-N-β-succinimidoethylaniline;
N-β-chloroethyl-N-β-succinimidopropylaniline;
N-β-cyanoethyl-N-β-phthalimidoethyl-m-anisidine;
N-gamma-chloro-β-hydroxypropyl-N-β-tetrahydrophthalimidoethyl-m-toluidine;
N-β-carbamylethyl-N-β-bicyclo(2.2.1)-5-heptane-2,3-dicarboximidoethyl-m-toluidine;
N-ethyl-N-β-maleimidoethyl-m-anisidine and the like.

The coupling components set forth above are conventionally prepared by reaction of an appropriate aminoalkylaniline compound with an appropriate dicarboxylic acid anhydride. Thus, a typical reaction occurs as follows:

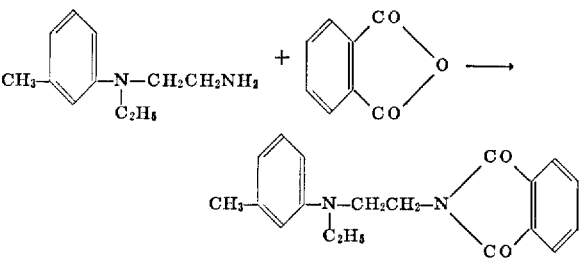

The following examples will serve to illustrate the preparation of representative intermediates and azo compounds of the invention.

PREPARATION OF THE COUPLERS

Example 1.—Preparation of N-ethyl-N-β-succinimidoethyl-m-toluidine

An amount of 89 g. (0.5 M) of N-β-aminoethyl-N-ethyl-m-toluidine and 50 g. (0.5 M) of succinic acid anhydride is mixed intimately and gradually heated until an exothermic reaction begins. When the temperature begins to fall, heat is applied and the temperature is held at 130–140° C. for one hour. The mixture is then drowned in one liter of water and allowed to cool. The yield is 99 g. of product melting at 81.5–82.5° C. and having the structure

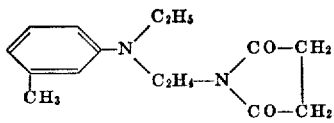

Example 2.—Preparation of N-ethyl-N-β-maleimidoethyl-m-toluidine

A mixture of 32.8 g. (0.2 M) bicyclo (2.2.1)-5-heptene-2,3-dicarboxylic acid anhydride and 35.6 g. (0.2 M) of N-ethyl-N-β-aminoethyl-m-toluidine is heated at 130–140° C. for one hour. The melt is poured into 200 ml. hot ethanol and allowed to cool overnight. The solid is filtered off, washed with ethanol and dried in air. The product, N[2-(N-ethyl - m - toluidine)ethyl] - bicyclo [2.2.1]-5-heptene-2,3-dicarboximide, has a melting point of 72–73.5° C. and, when heated at 250–275° C. for 10 minutes, evolves cyclopentadiene to yield N-ethyl-N-β-maleimidoethyl-m-toluidine which has the structure:

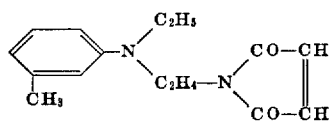

Example 3.—Preparation of N-ethyl-N-β-succinimidoethylaniline

A mixture of 32.8 g. (0.2 M) of N-ethyl-N-β-aminoethylaniline and 20 g. (0.2 M) succinic acid anhydride is heated with 0.1 g. sulfanilic acid to yield the product which has a melting point of 70–72° C. and has the structure:

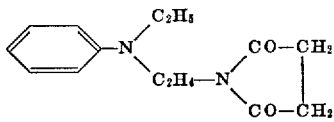

Example 4.—Preparation of N-β-chloroethyl-N-β-succinimidoethyl-m-toluidine

To 100 g. phosphorus oxychloride is added 75 g. N-β-hydroxyethyl - N - β - succinimidoethyl - m - toluidine portionwise with stirring. The temperature is kept at 20–30° C. during addition. The reaction is heated on the steam bath for 1 hr. and then drowned on ice-water mixture. This mixture is neutralized with 50% sodium hydroxide solution. The product crystallizes on standing and is collected by filtration, washed with water and air dried. It has the following structure:

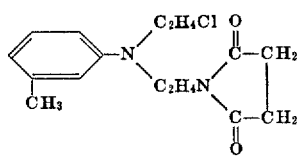

PREPARATION OF THE DYES

Example 5

A mixture of 2.94 g. (2-amino-5-methylthio-1,3,4-thiadiazole) is slurried in 48 ml. water, and 28 ml. conc. $H_2SO_4$ is added. The resulting solution is cooled to 0° C. and a solution of 1.44 g. $NaNO_2$ in 10 ml. conc. $H_2SO_4$ is added at 5° C. The diazotization is stirred at ice-bath temperature for 2 hrs. and is then added to a chilled (3°) solution of 5.6 g. N-ethyl-N,β-succinimidoethyl-m-toluidine in 100 ml. 15% aqueous $H_2SO_4$. The coupling is neutralized with solid ammonium acetate to brown on Congo red paper and is allowed to couple cold for 2 hrs. It is then drowned with water, filtered, washed with water and dried. The product dyes cellulose acetate, nylon, and polyester fibers red-orange shades of good fastness properties. It has the structure:

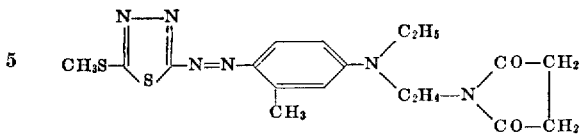

Example 6

Sodium nitrite (0.72 g.) dissolved in 5 ml. conc. $H_2SO_4$. The solution is cooled to less than 10° C. and 10 ml. of 1:5 acid (1 part propionic:5 parts acetic) is added below 20° C. The mixture is then cooled and 1.61 g. 2-amino-5-ethylthio-1,3,4-thiadiazole is added, followed by 10 ml. 1:5 acid, all at below 5° C. After stirring 2 hrs. at 0–5° C., the diazonium solution is added to 2.6 g. N-ethyl-N-β-succinimidoethyl-m-toluidine in 50 ml. 1:5 acid at below 10° C. The reaction is kept cold and neutralized with solid ammonium acetate until the solution turns Congo red paper brown. It is allowed to couple 1 hr., drowned with water, filtered, washed with water and air dried. The product dyes cellulose acetate, polyamide, and polyester fibers deep red shades. It has the following structure:

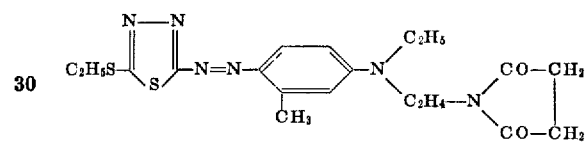

Example 7

2-amino-5-methylthio-1,3,4-thiadiazole (3.94 g.) is diazotised and coupled with 5.90 g. N-β-chloroethyl-N-β-succinimidoethyl-m-toluidine in 100 ml. 15% $H_2SO_4$ as described in Example 5. The product obtained dyes cellulose acetate and polyester fibers reddish-orange shades, and has the following structure:

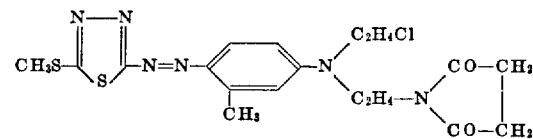

Example 8

2-amino-5-methylthio-1,3,4-thiadiazole (2.94 g.) is diazotized and coupled with 5.16 g. N-[2-(N-ethyl-m-toluidino)-ethyl]maleimide as described in Example 5. The dye obtained dyes cellulose acetate and polyamide fibers red shades having good fastness properties. It has the following structure:

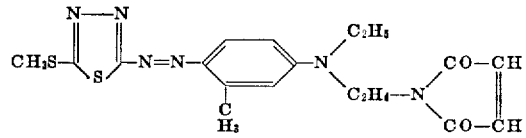

Example 9

A mixture of 2.94 g. of 2-amino-5-methylthio-1,3,4-thiadiazole is slurried in 48 ml. water, and 28 ml. conc. $H_2SO_4$ is added. The resulting solution is cooled to 0° C. and a solution of 1.44 g. $NaNO_2$ in 10 ml. conc. $H_2SO_4$ is added at 5° C. The diazotization is stirred at ice-bath temperature for 2 hr. and is then added to a chilled (3°) solution of 4.92 g. N-ethyl-N-β-succinimidoethylaniline in 100 ml. 15% aqueous $H_2SO_4$. The coupling is neutralized with solid ammonium acetate to brown on Congo Red paper and is allowed to couple cold for 2 hr. It is then drowned with water, filtered, washed with water and dried. The product dyes cellulose acetate, nylon and polyester fibers orange shades of good fastness properties. It has the structure:

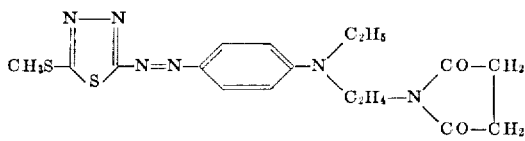

In accordance with the procedures set forth in Examples 5 through 9, the compounds set forth in the following table are prepared by diazotizing an appropriate 2-amino-1,3,4-thiadiazole and coupling the diazonium with an appropriate dicarboximidoalkyl aniline compound to yield the azo compound conforming to the formula

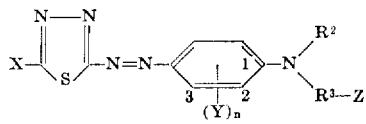

The color given in each of the examples refers to dyeings of the azo compound on polyamide fibers.

by which the compounds of the invention can be used to dye hydrophobic textile materials.

Example 33

0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. Then, 3 cc. of "Dacronyx" (a chlorinated benzene emulsion) are added and 10 grams of textile fabric made of poly-(ethylene terephthalate) polyester fibers are entered. The fabric is worked 10 minutes without heat and then for 10 minutes at 80° C. The dye bath is then brought to the boil and held at the boil for one hour. Following this, the fabric is rinsed in warm water, then scoured in aqueous 0.2% soap, 0.2% soda ash solution. After scouring, the fabric is rinsed with water and dried. When the compounds are used to dye polyamide textile materials, the above described procedure can be employed except the "Dacronyx" dyeing assistant need not be used.

TABLE

| Example | X | $(Y)_n$ | $R^2$ | $R^1$ | Z | Color |
|---|---|---|---|---|---|---|
| 10 | CH$_3$S | None | —C$_2$H$_4$Cl | —CH$_2$CH$_2$CH$_2$— | Succinimido | Orange. |
| 11 | C$_2$H$_5$S— | 3-CH$_3$ | —C$_2$H$_4$OH | —CH$_2$CHCH$_2$— (CH$_3$) | Phthalimido | Do. |
| 12 | C$_2$H$_5$S— | 3-OCH$_3$ | —C$_2$H$_4$CN | —CH$_2$CH$_2$— | ....do.... | Red. |
| 13 | C$_3$H$_7$S— | 3-OCH$_3$ | —C$_2$H$_4$Z | —CH$_2$CH$_2$— | Maleimido | Red. |
| 14 | C$_6$H$_5$S— | 3-Cl | —C$_4$H$_9$— | —CH$_2$CH$_2$— | ....do.... | Orange. |
| 15 | Cyclohexylthio | 2-CH$_3$ | H | —CH$_2$CH$_2$— | Citraconamido | Do. |
| 16 | Cyclohexylthio | 3-NHCOCH$_3$ | —C$_2$H$_5$ | —CH$_2$CH$_2$— | ....do.... | Red. |
| 17 | CH$_3$SO$_2$— | 3-NHCOCH$_3$ | —C$_2$H$_5$ | —CH$_2$CH$_2$— | Succinimido | Pink. |
| 18 | CH$_3$SO$_2$— | 3-OCH$_3$-6-CH$_3$ | —C$_2$H$_4$OCOCH$_3$ | —CH$_2$CH$_2$— | ....do.... | Do. |
| 19 | CH$_3$— | 2,5-di-OCH$_3$ | —C$_2$H$_4$SO$_2$CH$_3$ | —CH$_2$CH$_2$— | Nitrophthalimido | Red. |
| 20 | CH$_3$— | 2,5-di-CH$_3$ | —C$_2$H$_4$CONH$_2$ | —CH$_2$CH$_2$— | Tetrachlorophthalimido | Red. |
| 21 | C$_6$H$_5$— | 2,5-di-CH$_3$ | —C$_2$H$_4$OCNHC$_6$H$_5$ (O) | —CH$_2$CH$_2$— | Hexahydrophthalimido | Red. |
| 22 | C$_6$H$_5$— | 2,5-di-CH$_3$ | —CH$_2$CHOHCH$_2$OH | —CH$_2$CH$_2$— | Phthalimido | Red. |
| 23 | NCCH$_2$CH$_2$S— | 3-CH$_3$ | —CH$_2$CHOHCH$_2$Cl | —CH$_2$CH$_2$— | Tetrahydrophthalimido | Red. |
| 24 | NCCH$_2$CH$_2$S— | 3-CH$_3$ | —CH$_2$CH$_2$CONH$_2$ | —CH$_2$CH$_2$— | Bicyclo[2.2.1]-5-heptene-2,3-dicarboximido. | Red. |
| 25 | NCCH$_2$CH$_2$S— | 3-CH$_3$ | —CH$_2$CH$_2$OCH$_3$ | —CH$_2$CH$_2$— | ....do.... | Red. |
| 26 | CH$_3$CONH | 3-CH$_3$ | —CH$_2$CH$_2$NHCOCH$_3$ | —CH$_2$CH$_2$— | Succinimido | Red. |
| 27 | CH$_3$CONH | 3-CH$_3$ | —CH$_2$CH$_2$CO$_2$C$_2$H$_5$ | —CH$_2$CH$_2$— | ....do.... | Red. |
| 28 | C$_6$H$_5$SO$_2$ | 3-CH$_3$ | —C$_2$H$_5$ | —CH$_2$CH$_2$— | ....do.... | Pink. |
| 29 | C$_6$H$_5$SO$_2$ | 3-CH$_3$ | —C$_2$H$_4$Cl | —CH$_2$CH$_2$— | ....do.... | Do. |
| 30 | Br | 3-CH$_3$ | —C$_2$H$_4$Cl | —CH$_2$CH$_2$— | ....do.... | Do. |
| 31 | Cl | 3-CH$_3$ | —C$_2$H$_4$Cl | —CH$_2$CH$_2$— | ....do.... | Do. |
| 32 | —CH$_2$CO$_2$C$_2$H$_5$ | 3-CH$_3$ | —C$_2$H$_4$Cl | —CH$_2$CH$_2$— | ....do.... | Do. |

The thiadiazolylazo compounds of the invention can be used for dyeing textile materials, including protein and synthetic polymer fibers, yarns and fabrics, giving a variety of fast brilliant pink to violet shades when applied thereto by conventional dye methods. The compounds have high affinity for cellulose ester, polyester and nylon fibers. When the thiadiazolylazo compounds are used for dyeing such hydrophobic materials, they should be free of water-solubilizing groups such as sulfo and carboxyl. In general, the compounds of the invention have excellent fastness, for example, to light, washing, gas (atmospheric fumes) and sublimation. The compounds display particularly good fastness properties, e.g. to light and washing, when used as dyes on polyamide textile materials.

As described above, the present compounds have the characteristic structure of Formula I. This distinctive structure imparts unexpected properties to the compounds, including the above-described light fastness and sublimation resistance. Thus, we have found the compounds of the invention to possess properties superior to similar but distinct and different compounds when used as dyes and tested by methods such as described in the A.A.T.C.C. Technical Manual, 1965 edition.

The compounds of the invention can be used for dyeing hydrophobic fibers such as linear polyester, cellulose ester, polyamide, etc., fibers in the manner described in U.S. Patents 2,880,050, 2,782,187, 2,757,064 and 3,043,827. The following example illustrates a method Accordingly, since the thiadiazolyazo compounds of the invention are water-insoluble, they can be applied from aqueous dispersions in the manner of the so-called "dispersed dyes." However, coloration can also be effected for example, by incorporating the compounds into the spinning dope or melt and spinning the fiber as usual. The compounds of the invention are not necessarily equivalents when used as dyes. The degree of dye affinity varies, for example, depending upon the material being dyed and the formula of the thiadiazolyazo compound. Thus, for example, all the dyes will not have the same degree of affinity for the same material.

Polymeric linear polyester materials of the terephthalate type are illustrative of the linear aromatic polyester textile materials that can be dyed with the new compounds of our invention. Examples of such linear polyester materials are those prepared from ethylene glycol and dimethylterephthalate and those prepared from 1,4-cyclohexanedimethanol and dimethylterephthalate. Polyester textile materials prepared from 1,4-cyclohexanedimethanol and dimethylterephthalate are more particularly described in U.S. Patent 2,901,446. Poly-(ethylene terephthalate) fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Examples of the polyamide fibers that can be dyed with the compounds of the invention are those consisting of nylon 66, made by the polymerization of adipic acid and hexamethylenediamine, nylon 6, prepared from epsilon-aminocaproic acid lactam, and nylon 8.

The invention has been described in considerable detail with particular reference to certain preferred embodiments thereof, but it will be understood that variations and modifications can be effected within the spirit and scope of the invention.

We claim:
1. A water-insoluble compound having the formula

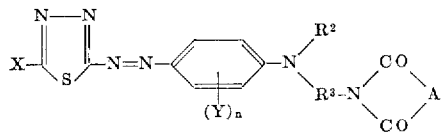

wherein
X is hydrogen, lower alkyl, lower alkylthio, chlorine, bromine, lower alkylsulfonyl, phenyl, phenylthio, or cyclohexylthio;
Y is hydrogen, lower alkyl, lower alkoxy, lower alkanoylamino, chlorine, or bromine; and $n$ is 1 or 2;
$R^2$ is hydrogen; lower alkyl; lower alkyl substituted with hydroxy, lower alkoxy, cyano, lower alkanoyloxy, lower alkoxycarbonyl, chlorine, bromine, lower alkanoylamino, carbamoyl, N-phenylcarbamoyloxy, loweralkylsulfonyl, phenyl, phenoxy, or lower alkylsulfonamido; cyclohexyl; phenyl; phenyl substituted with lower alkyl, lower alkoxy, nitro, chlorine or bromine; or

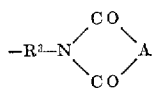

$R^3$ is lower alkylene or lower alkylene substituted with hydroxy, chlorine, bromine or lower alkanoyloxy; and
A is alkylene of 2 or 3 carbon atoms; alkylene of 2 or 3 carbon atoms substituted with lower alkyl; vinylene; lower alkylvinylene; o-phenylene; tetrahydro-o-phenylene; 1,2-cyclohexylene; or bicyclo-[2.2.1]-5-heptene-2,3-diyl.
2. A compound according to claim 1 wherein

X is lower alkylthio or phenylthio;
$R^3$ is lower alkylene; and
A is alkylene of 2 or 3 carbon atoms; alkylene of 2 or 3 carbon atoms substituted with lower alkyl; o-phenylene; 1,2-cyclohexylene; or bicyclo[2.2.1]-5-heptene-2,3-diyl.
3. A compound having the formula

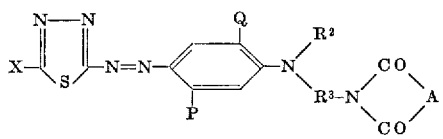

wherein
X is lower alkylthio or phenylthio;
P is hydrogen, lower alkoxy, chlorine, bromine, or lower alkanoylamino;
Q is hydrogen, lower alkyl, lower alkoxy, chlorine, or bromine;

$R^2$ is lower alkyl, lower chloroalkyl, lower bromoalkyl, lower cyanoalkyl, or lower alkanoyloxyalkyl;
$R^3$ is lower alkylene; and
A is ethylene or o-phenylene.
4. A water-insoluble compound according to claim 3 wherein
X represents lower thioalkyl, $R^2$ represents lower alkyl, and $R^3$ represents ethylene.
5. A water-insoluble compound as defined in claim 1 having the formula

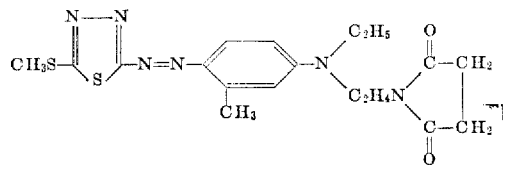

6. A water-insoluble compound as defined in claim 1 having the formula

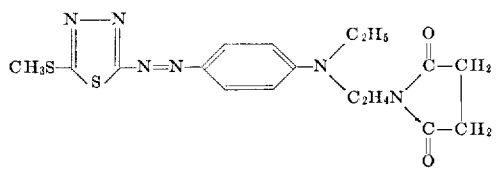

7. A water-insoluble compound as defined in claim 1 having the formula

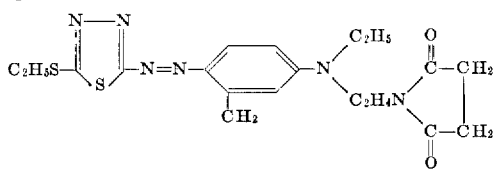

8. A water-insoluble compound as defined in claim 1 having the formula

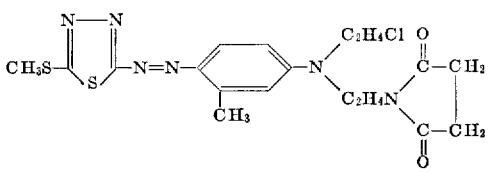

9. A water-insoluble compound as defined in claim 1 having the formula

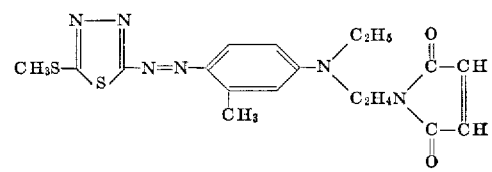

References Cited
UNITED STATES PATENTS
3,148,180  9/1964  Straley et al. -------- 260—158

CHARLES B. PARKER, Primary Examiner
D. M. PAPUGA, Assistant Examiner

U.S. Cl. X.R.
8—41, 55; 260—37, 306.8, 326, 37, 40